(12) United States Patent
Finotti

(10) Patent No.: US 6,634,064 B2
(45) Date of Patent: Oct. 21, 2003

(54) SEAT BELT TONGUE WITH HANDLE

(75) Inventor: Daniele Finotti, Turin (IT)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 10/193,915

(22) Filed: Jul. 15, 2002

(65) Prior Publication Data
US 2003/0088953 A1 May 15, 2003

(30) Foreign Application Priority Data
Nov. 9, 2001 (IT) .................... MI2001A2356

(51) Int. Cl.⁷ .............................................. A44B 11/25
(52) U.S. Cl. ............................................ 24/198; 24/633
(58) Field of Search .................. 24/198, 633; 280/801.1, 280/808; 297/468, 483, 484

(56) References Cited
U.S. PATENT DOCUMENTS 3,542,426 A * 11/1970 Radke .................... 24/579.11
3,790,209 A * 2/1974 Littmann .................... 297/483
3,845,524 A * 11/1974 Hull et al. ................ 24/579.11
3,982,769 A * 9/1976 Farlind ........................ 297/475
4,291,919 A * 9/1981 Schmid et al. .............. 297/483
4,944,557 A * 7/1990 Tsubai ........................ 297/468
5,197,176 A * 3/1993 Reese ........................... 29/278
5,443,577 A * 8/1995 Kim ........................... 280/802
5,954,397 A * 9/1999 Czernakowski et al. . 297/250.1
6,484,369 B1 * 11/2002 Conaway .................. 24/163 R

FOREIGN PATENT DOCUMENTS

EP 642947 A1 * 3/1995 ............ B60N/2/24

* cited by examiner

Primary Examiner—James R. Brittain
(74) Attorney, Agent, or Firm—Lonnie R. Drayer

(57) ABSTRACT

To improve the grasp on the tongue of a seat belt, a handle extends from the seat belt tongue in the forward direction of the seat belt and is attached in a rotating manner to the central or rear portion of the tongue to perform rotation of the tongue in relation to the handle when the handle is grasped and pulled forward to fasten the seat belt.

12 Claims, 5 Drawing Sheets

SEAT BELT TONGUE WITH HANDLE

FIELD OF THE INVENTION

The present invention relates to a seat belt tongue having a handle. The invention also relates to a seat belt with a tongue having a handle.

BACKGROUND OF THE INVENTION

In automobiles provided with only two passenger doors and four or five seats the front seat belts are positioned in a rearward position, in relation to the effective position of use, to allow easier access to the rear seats. In general the lower attachment point of the shoulder portion of the seat belt is positioned slidably on a rod fixed to the floor of the vehicle, as shown in FIG. 1, and translates from the rearward position which is assumed with the seat belt in the rearward position to a forward position when the seat belt is in use. This makes accessibility to the tongue of the seat belt difficult when it is in the rearward position.

The solutions proposed contemplate the use of "seat belt presenter" devices which draw the belt, and the tongue, forward to facilitate gripping by the user. Known seat belt presenter devices are either electrical or mechanical and are composed of numerous assembled parts which, even in the case of mechanical seat belt presenter devices, have high production costs. There is a need to produce a device to facilitate gripping seat belts that is inexpensive, easy to produce and to use, reliable and does not interfere with attachment and release of the tongue from the buckle.

SUMMARY OF THE INVENTION

There is provided in accordance with one aspect of the present invention a seat belt tongue comprising a metal latching portion adjacent a front end of the tongue and a widened rearward part adjacent a rear end of the tongue and that has a webbing receiving slot therethrough, a handle is attached to the seat belt tongue in a rotatable manner to allow rotation of said seat belt tongue in relation to the handle following movement of said seat belt tongue.

There is provided in accordance with another aspect of the present invention a seat belt comprising seat belt webbing having a seat belt tongue attached to an end of the seat belt webbing, the seat belt tongue comprising a metal latching portion adjacent a front end of the tongue and a widened rearward part adjacent a rear end of the tongue and that has a webbing receiving slot therethrough, the seat belt webbing passing through said slot, and a handle is attached to the seat belt tongue in a rotatable manner to allow rotation of said seat belt tongue in relation to the handle following movement of said seat belt tongue.

DETAILED DESCRIPTION OF THE INVENTION

Figure 4:
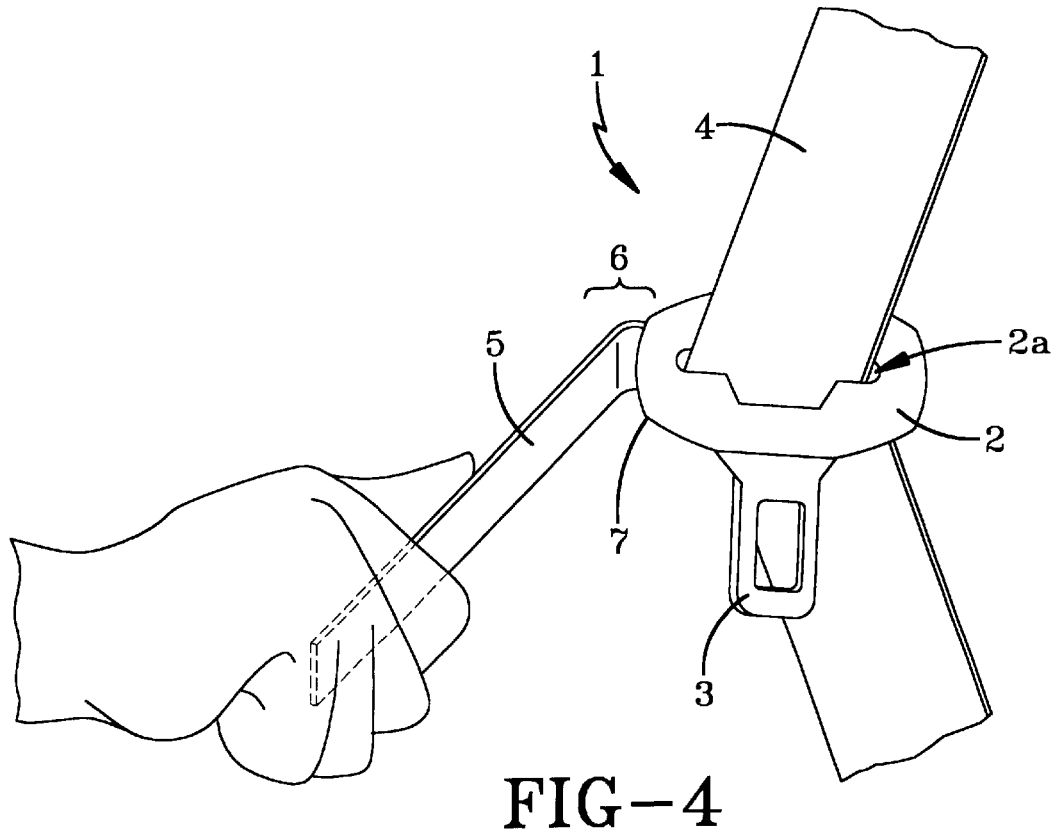
FIG. 4 is an enlarged view of the seat belt tongue in the operative condition.
Figure 5:
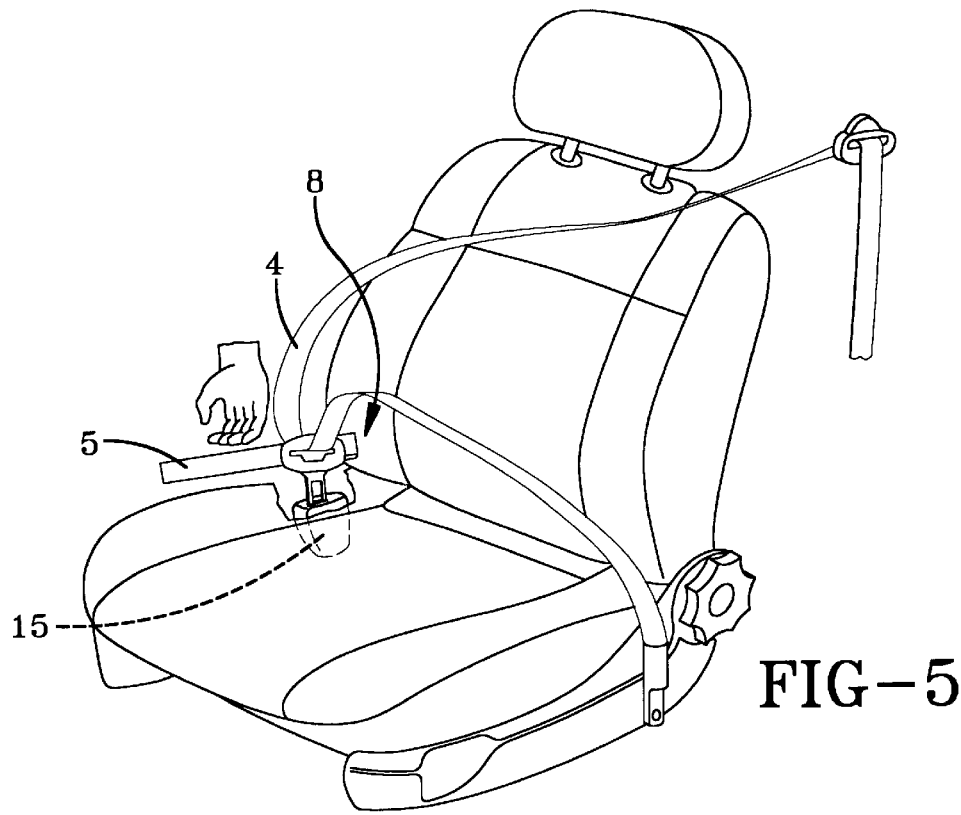
FIG. 5 is a perspective view of the seat belt in the phase of attachment into a buckle.
Figure 8:
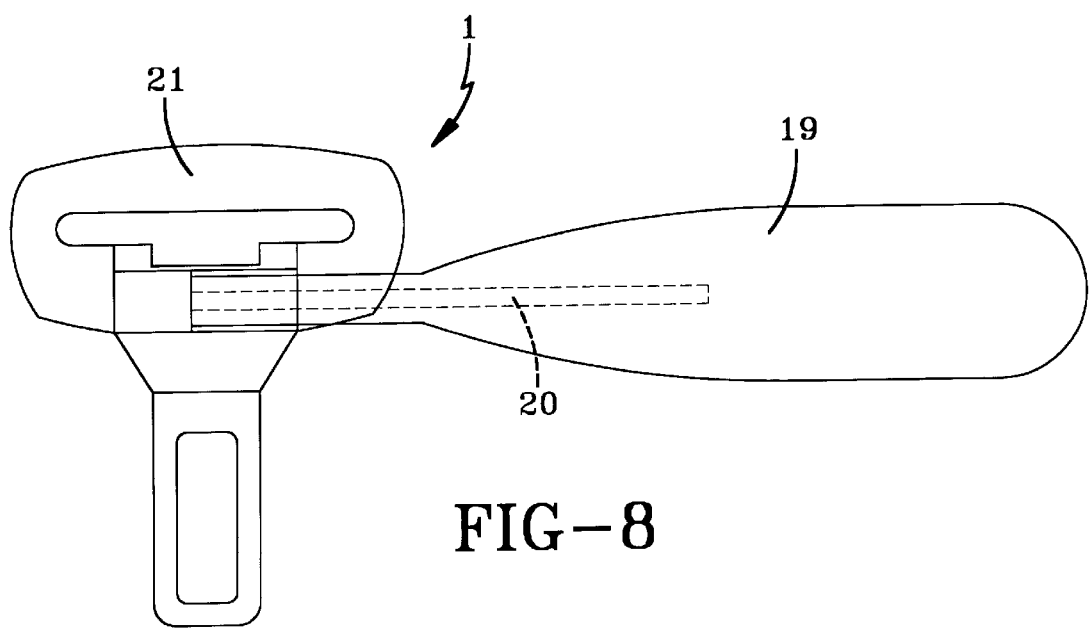
FIG. 8 is a schematic side view of a further embodiment with central rotating attach.
Figure 9:
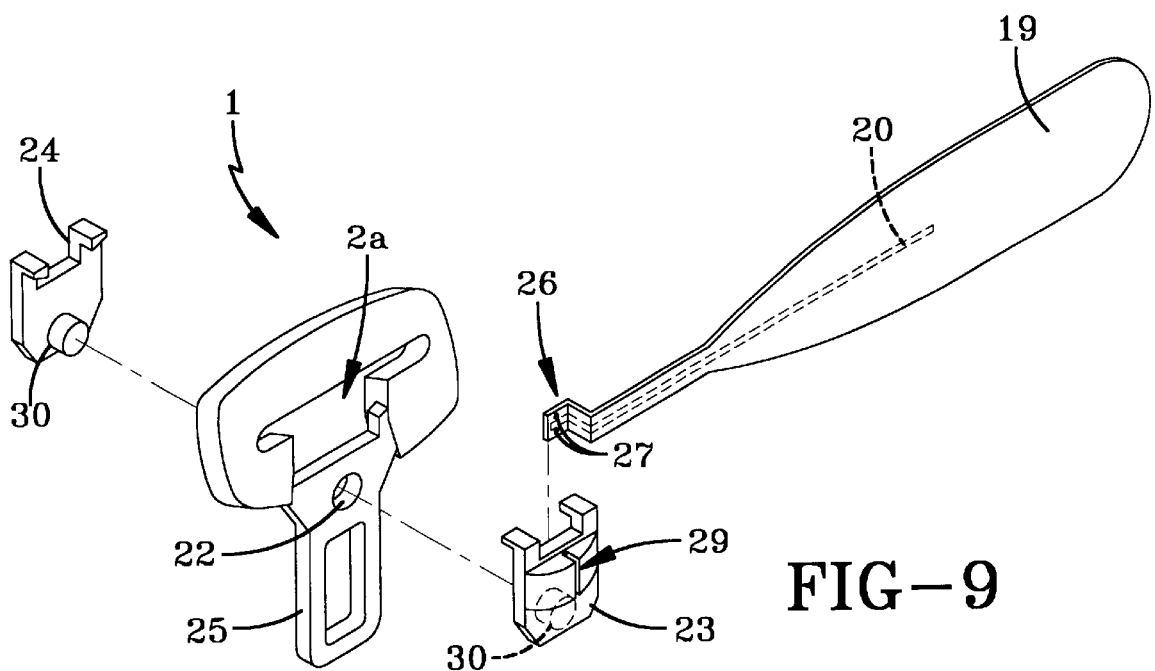
FIG. 9 is an exploded view of the embodiment shown in FIG. 8.

With reference to FIGS. 4, 8 and 9, a seat belt tongue 1 according to the invention comprises in a per se known manner a metal latching portion 3, 25 adjacent a front end of the tongue and a widened rearward part adjacent a rear end of the tongue which may be provided with a partial covering 2, 21 of a plastic material and has a webbing slot or gap 2a therethrough which the webbing 4 of the seat belt passing through the slot.

Figure 1:
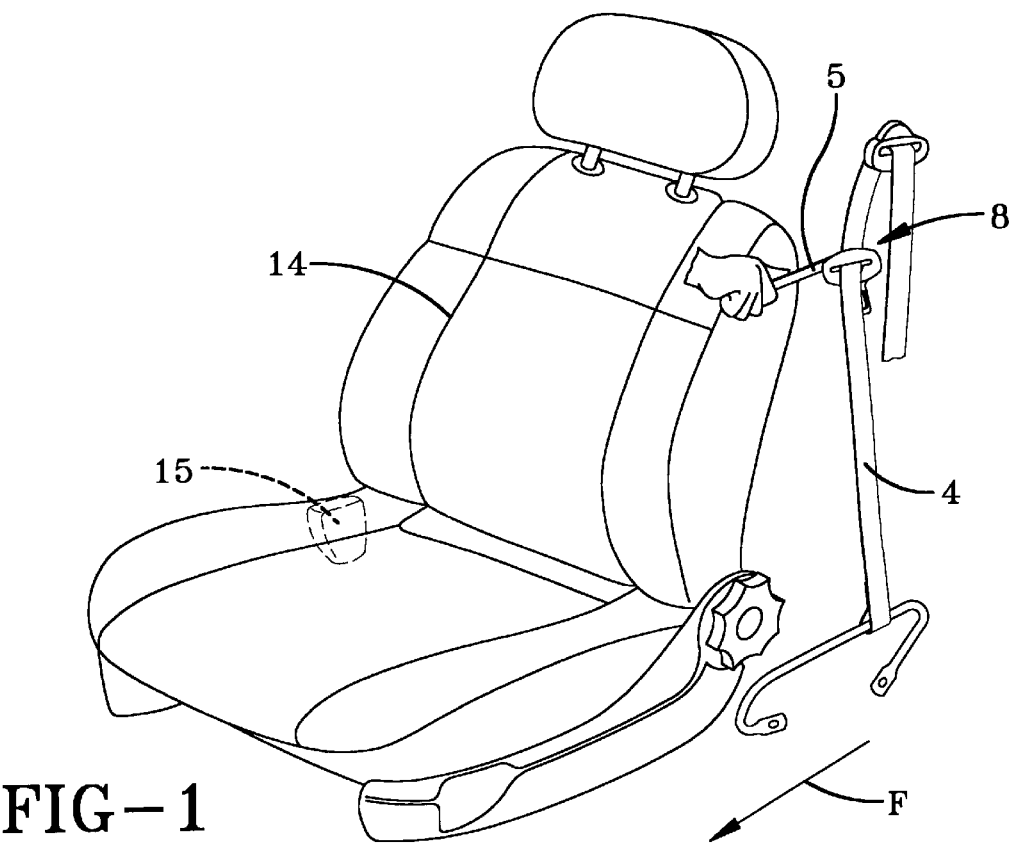
FIG. 1 is a perspective view of the seat belt according to the invention in a rearward position.
Figure 2:
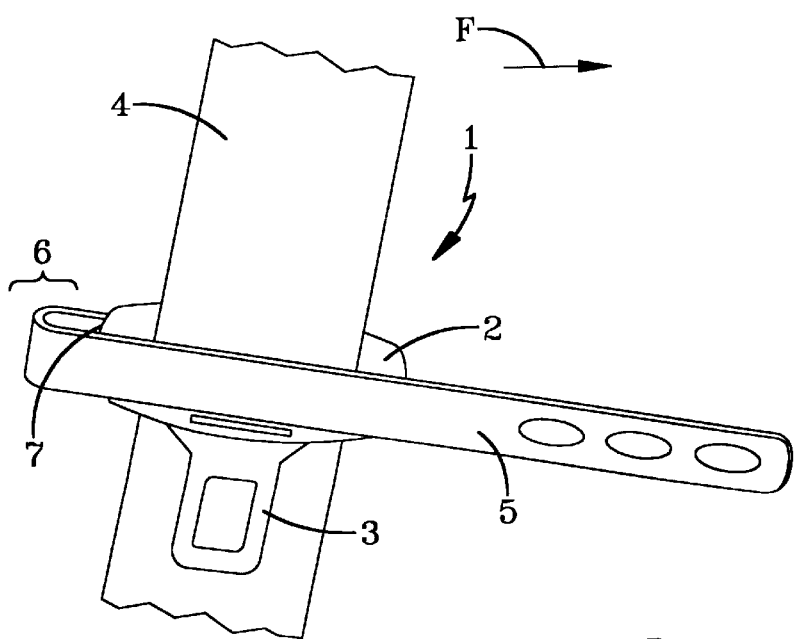
FIG. 2 is an enlarged view of the seat belt tongue according to the invention in the parking position.
Figure 3:
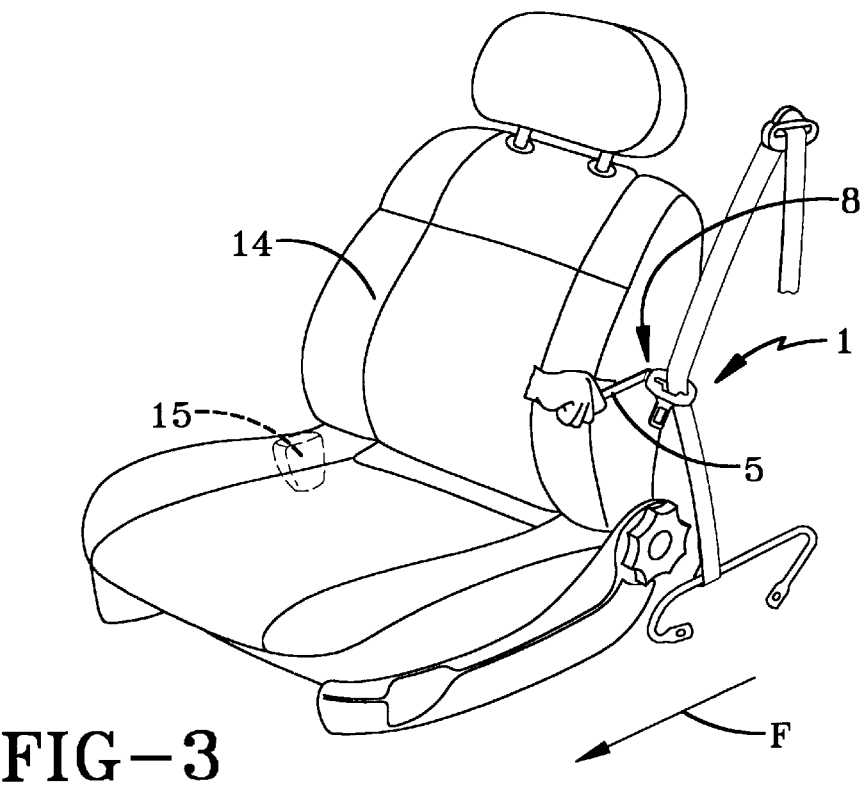
FIG. 3 is a view of the seat belt during forward movement.

According to the present invention, the seat belt tongue 1 also comprises a handle 5, 19 which extends from the seat belt tongue 1 in the forward direction of the seat belt, indicated by an arrow F in the figures. In other words, the handle 5, 19 projects towards the front of the vehicle, as shown in FIGS. 1 and 3, and functions as a handle for gripping the seat belt tongue 1. The handle 5, 19 is grasped in place of the seat belt tongue 1 when fastening the seat belt. For this purpose, the handle 5 is of a length that allows the user to grasp it easily. The handle is connected to the seat belt tongue 1 by means for attaching the handle to the seat belt tongue 1 in a rotatable manner, so that the seat belt tongue 1 can rotate relative to the handle 5, or vice versa, following movement of said handle in the forward direction of the seat belt. The handle 5, as shown in FIGS. 1–7, is attached to the seat belt tongue 1 in the near the rear end of the tongue, which is on the opposite side to the one towards which the handle extends 5. However, it is possible for the handle 19 to be attached to the seat belt tongue in a central position, about midway between the front and rear end of the tongue, as shown in FIG. 8.

An example of a means for attaching the handle to the seat belt tongue in a rotatable manner is shown in FIGS. 2, 4 and 8–10. In the embodiment in FIGS. 2 and 4 the handle comprises an elastically deformable element made of a rubber or elastomeric material provided with a curved portion 6 that allows the handle to be connected to the rear side 7 of the seat belt tongue 1. The curve 6 is a U-shaped curve and in the parking position shown in FIG. 2 the seat belt tongue 1 and the handle 5 are therefore essentially parallel.

Figure 10:
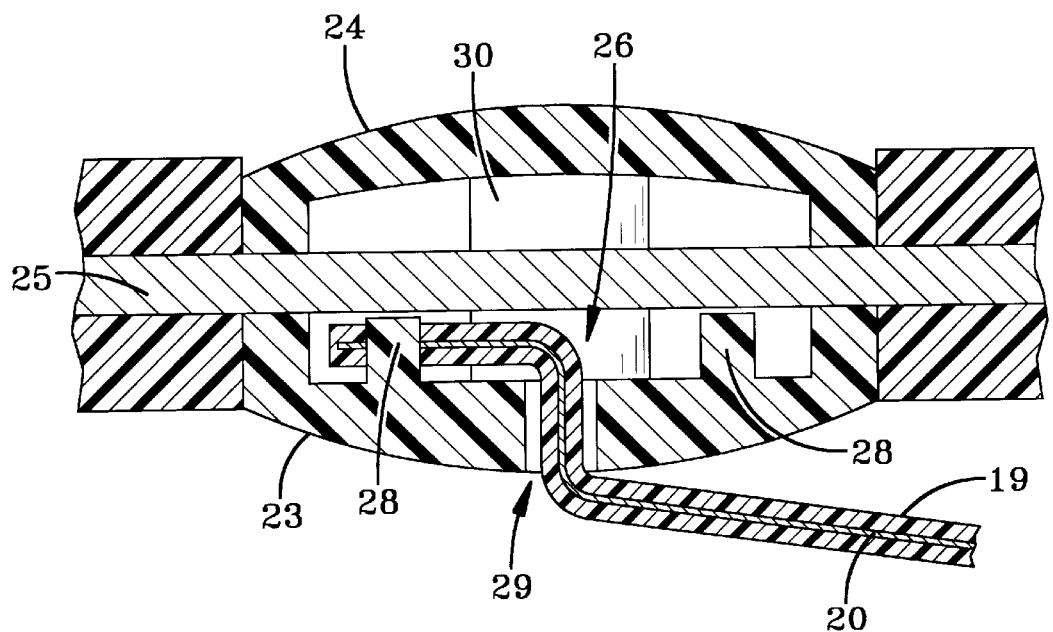
FIG. 10 is a cross-sectional view of the embodiment shown in FIG. 8

In the embodiment shown in FIGS. 8–10 a handle 19, comprising a plastic material and including a metal core 20, such as steel, is attached to the seat belt tongue 21 in a central position. The plastic material of the handle 19 is generally a thermoplastic to give a "soft-touch" effect and the metal core 20 provides the necessary elasticity for return of the handle after use. The seat belt tongue 21 has a gap in its plastic cover and a hole 22 extending completely through its metal portion 25. The handle 19 is attached to the seat belt tongue 21 by two half-shells 23, 24 that are fitted over the metal portion 25 at the aforesaid gap in the plastic coating. The half-shells are attached to one another in a known manner, such as molding or bonding. The half-shell 23 has a gap or slot 29 through which the fixing end of the handle 19 is inserted; to prevent the handle from escaping from the half-shells the end 26 of the handle 19 is S-shaped and has a pair of holes 27 therethrough. On the inner surface of the half-shell 23 there are two pairs of corresponding pins 28, that is two pairs of pins arranged symmetrically in relation to the gap 29 and with dimensions and positions corresponding to the holes 27 to engage these holes when the seat belt tongue is attached to the handle. As shown in FIG. 10, the handle 19 is held in position by one of the two pairs of pins 28 and the metal portion 25 acts as an obstruction. Two symmetrical pairs of pins are present so that the seat belt tongue can be fitted to the right or left of the gap 29 according to the seat on which the seat belt tongue must be fitted. In this way, this embodiment permits the seat belt tongue to be fitted without distinction on the right or left of the motor vehicle as the handle can in turn be fitted projecting to the right or to the left, thanks to the two pairs of pins 28.

The two half-shells 23, 24 are in contact with one another and molded or bonded over the metal portion 25 and through the hole by projecting parts 30.

Alternatively, another embodiment is contemplated in which the handle 19 is molded in a single piece with one of the half-shells and has no metal core 20; the elasticity required for return of the handle is provided by the material used for this.

Figure 6:
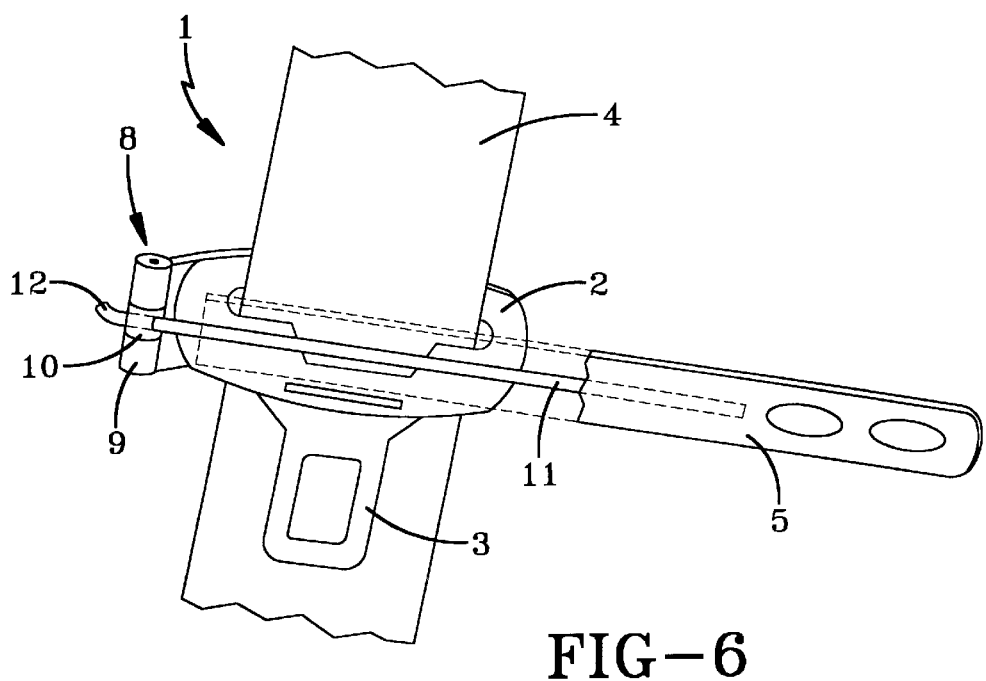
FIGS. 6 and 7 are schematic views of two embodiments of seat belt tongues provided with a hinge.

Another embodiment of the means for attaching the handle to the seat belt tongue in a rotatable manner comprises a hinge 8 as shown in FIG. 6. The hinge 8 has a portion 9 fixed and integral with the seat belt tongue 2, for example in a single piece with the cover 2 of this, and a rotating portion 10 that is integral with the handle 5. In the embodiment shown in FIG. 6 the handle 5 is made of a plastic material, for example a soft-touch elastomer, molded over a rigid element 11, for example in metal, which is integral with the rotating portion 10 of the hinge 8. The hinge 8 also comprises a spring, which is not shown, or similar elastic means that bias the handle 5 towards the seat belt tongue 1 so as to guarantee elastic return of the handle towards the seat belt tongue after the handle has been used. In the embodiment shown in FIG. 2 this effect is obtained directly by the elastic nature of the handle material.

Figure 7:
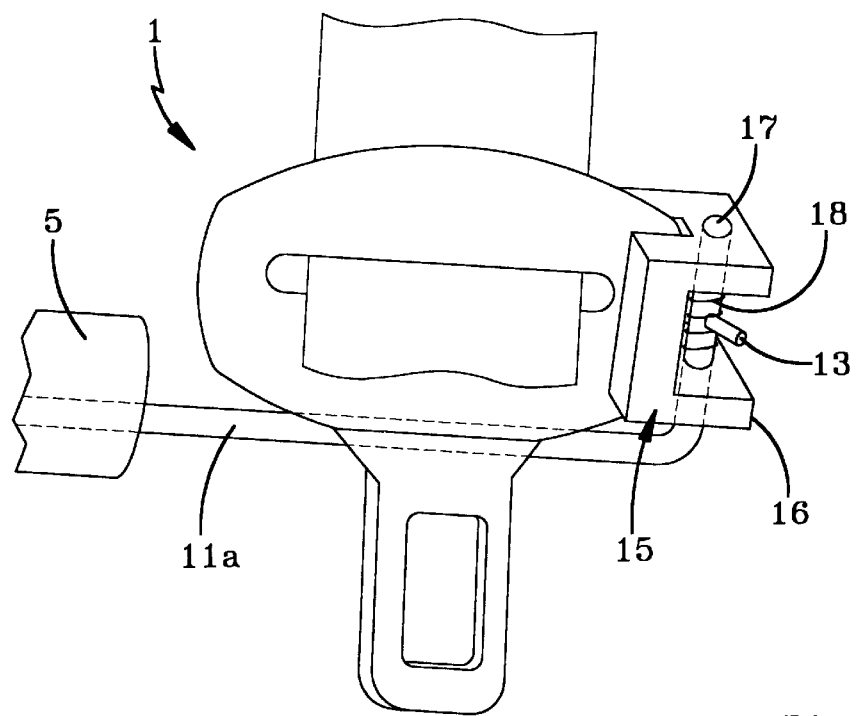

In the embodiment shown in FIG. 7 the end portion of the rigid element 11a is curved through 90 degrees and is housed in a fixed C-shaped support 15. The free part of the handle 11a which is located between the two lower and upper ends 16, 17, of the "C" of the support is provided in a known manner with a spring to return the handle to the position adjacent to the seat belt tongue.

The embodiment with hinged attaching also comprises means for limiting the amplitude of the angle of rotation between the handle and the seat belt tongue. In the embodiment shown in FIG. 6 the means for limiting comprises an element 12 projecting from the rotating portion 10 of the hinge comprise the end of the rigid element 11, suitably curved after having passed through the rotating element 10. In the embodiment with the elastically deformable handle shown in FIG. 2, the amplitude of rotation is automatically limited by the nature of the handle. In the embodiment shown in FIG. 7 the stop is produced by an element 13 projecting from the end part of the handle 11a.

In all cases the amplitude of the angle that is formed between the handle and the seat belt tongue is between 60 and 120 degrees and preferably between 75 and 105 degrees. These angles allow the webbing 4 of the seat belt to slide without impediment inside the slot 2a; with smaller or larger angles the webbing gets caught up easily in the slot making forward movement of the seat belt difficult.

Operation of the present invention will now be illustrated with reference to the figures. Initially, as shown in FIGS. 1, 2 and 6, the handle is adjacent to the seat belt tongue 1, generally in contact with it, at the side of the seat 14. The handle 5 projects towards the front of the vehicle and is grasped by a vehicle occupant who performs traction in the forward direction of the seat belt, initially in the direction indicated by the arrow F. Following the traction and resistance performed by the webbing 4 of the seat belt, rotation occurs between the handle and the seat belt tongue to form an angle that varies according to the type of rotatable attaching used. In the embodiment with a hinge the angle is preferably around 80–85 degrees, as shown in FIGS. 3 and 4. In the embodiment with the elastic handle attached at the rear or centrally the angle may be less, although in all cases there is rotation, namely the forming of an angle between the handle and the seat belt tongue.

Thanks to the aforesaid rotation, the seat belt tongue 1 is arranged in a position more or less transverse to the direction indicated by the arrow F to permit the webbing 4 of the seat belt to slide inside the slot 2a as required.

The seat belt tongue is then taken to the opposite side of the seat 14 and inserted into the retaining buckle 15. When the handle 5, 19 is released it returns to the position adjacent to the seat belt tongue by the return spring, in embodiments with mechanical hinge, or thanks to the elasticity of the material of the handle 5, as shown in the embodiment in FIG. 2, and the metal core, as shown in the embodiment in FIG. 9.

The invention also relates to a seat belt wherein in comprises a tongue of the type described above.

The invention has numerous advantages in relation to known prior art. In fact, the invention allows the elimination of "seat belt presenter" devices with evident advantages for design and cost; at the same time, the tongue according to the present invention is easy to produce and with much lower costs. The simplicity of production translates into high reliability of the device.

Many changes and modifications in the above described embodiment of the invention can, of course, be carried out without departing from the scope thereof. Accordingly, that scope is intended to be limited only by the scope of the appended claims.

I claim:

1. A seat belt tongue comprising a metal latching portion adjacent a front end of the tongue and a widened rearward part adjacent a rear end of the tongue and that has a webbing receiving slot therethrough, a handle comprising an elastically deformable material is attached to the seat belt tongue by a means for attachment positioned nearer to the rear end of the tongue in a rotatable manner to allow rotation of said seat belt tongue in relation to the handle following movement of said seat belt tongue, and further comprising a means for limiting the rotation between the handle and the seat belt tongue to an angle below 180 degrees.

2. The seat belt tongue as claimed in claim 1, wherein said means for attaching the handle to the seat belt tongue in a rotatable manner comprises a hinge.

3. The seat belt tongue as claimed in claim 1, further comprising a pair of half-shell elements attached to one another over said tongue and a means for restraining said handle.

4. The seat belt tongue as claimed in claim 3, wherein said means for restraining the handle comprise a pair of holes on the end of said handle and two pairs of corresponding pins arranged inside one of said half-shell elements.

5. The seat belt tongue as claimed in claim 4, wherein said means for restraining the handle comprise a pair of holes on the end of said handle and two pairs of corresponding pins arranged inside one of said half-shell elements.

6. The seat belt tongue as claimed in claim 5, wherein said means for restraining the handle comprise a pair of holes on the end of said handle and two pairs of corresponding pins arranged inside one of said half-shell elements.

7. The seat belt tongue as claimed in claim 3, wherein said handle is in a single piece with one of said half-shells.

8. The seat belt tongue as claimed in claim 1, wherein the angle of rotation between the tongue and the handle is limited to a range of between 50 and 120 degrees.

9. A seat belt comprising seat belt webbing having a seat belt tongue attached to an end of the seat belt webbing, the seat belt tongue comprising a metal latching portion adjacent a front end of the tongue and a widened rearward part adjacent a rear end of the tongue and that has a webbing receiving slot therethrough, the seat belt webbing passing through said slot, and a handle is attached to the seat belt tongue in a rotatable manner to allow rotation of said seat belt tongue in relation to the handle following movement of said seat belt tongue, and further comprising a pair of half-shell elements attached to one another over said tongue and means for retaining said handle.

10. The seat belt as claimed claim 9, wherein said handle comprises elastically deformable material.

11. The seat belt as claimed in claim 9, wherein said means for attaching the handle to the seat belt tongue in a rotatable manner comprises a hinge.

12. The seat belt tongue as claimed in claim 9, wherein the angle of rotation between the tongue and the handle is between 50 and 120 degrees.

* * * * *